United States Patent
Huibers

(10) Patent No.: US 6,999,224 B2
(45) Date of Patent: Feb. 14, 2006

(54) MICROMIRROR MODULATION METHOD AND DIGITAL APPARATUS WITH IMPROVED GRAYSCALE

(75) Inventor: Andrew Huibers, Palo Alto, CA (US)

(73) Assignee: Reflectivity, INC, Sunnyvale, CA (US)

( * ) Notice: Subject to any disclaimer, the term of this patent is extended or adjusted under 35 U.S.C. 154(b) by 51 days.

(21) Appl. No.: 10/798,777

(22) Filed: Mar. 10, 2004

(65) Prior Publication Data

US 2005/0200939 A1    Sep. 15, 2005

(51) Int. Cl.
   *G02B 26/00*    (2006.01)
(52) U.S. Cl. ............................. 359/290; 359/298
(58) Field of Classification Search ............... 359/290
   See application file for complete search history.

(56) References Cited

U.S. PATENT DOCUMENTS

| | | |
|---|---|---|
| 4,441,791 A | 4/1984 | Hornbeck |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,638,309 A | 1/1987 | Ott |
| 4,662,746 A | 5/1987 | Hornbeck |
| 4,956,619 A | 9/1990 | Hornbeck |
| 5,134,491 A | 7/1992 | Muraji et al. |
| 5,835,256 A | 11/1998 | Huibers |
| 6,388,661 B1 | 5/2002 | Richards |
| 2001/0040675 A1 | 11/2001 | True et al. |
| 2003/0179211 A1 * | 9/2003 | Wada et al. ................. 345/589 |

* cited by examiner

*Primary Examiner*—Scott J. Sugarman
*Assistant Examiner*—Richard Hanig
(74) *Attorney, Agent, or Firm*—Gregory R. Muir

(57) ABSTRACT

A method and apparatus are disclosed for increasing contrast in micromirror-based image display devices. As a result the displayed image is a more faithful reproduction of the original and is more pleasing to human perception than is possible with a low contrast display. The method and apparatus comprise a micromirror design and a modulation scheme for driving micromirrors with a combination of analog and digital techniques to achieve partial and full micromirror deflection. The analog techniques permit the mirrors to be deflected to positions intermediate between the resting position and the position of maximum deflection. These intermediate deflections appear as intermediate light levels in an image. Compared to digital modulation, the analog techniques provide an increase in the number of light levels that can be displayed by a system that is limited by its incoming data rate and maximum micromirror speed.

36 Claims, 5 Drawing Sheets

Duration of applied electrical pulse

MICROMIRROR MODULATION METHOD AND DIGITAL APPARATUS WITH IMPROVED GRAYSCALE

TECHNICAL FIELD OF THE INVENTION

The present invention is related generally to image display techniques and micromirror-based displays.

BACKGROUND OF THE INVENTION

As market demands increase for display systems showing high quality images, micromirrors and micromirror arrays have blossomed in display applications.

A common parameter in the evaluation and characterization of display systems is contrast. Contrast is defined as the ratio between the brightest and dimmest intensity that a display is capable of rendering in an image. Hence, a display that shows parts of an image as bright white while other areas of the same image are dark black has more contrast than a display which shows the same image in intermediate gray tones.

Creating a display with high contrast is challenging from an engineering standpoint since human perception of brightness is nonlinear. Humans resolve brightness differences between dim objects more precisely than between bright objects. Hence a faithful display must be able to reproduce more finely spaced brightness levels for the display of dim images than for bright ones.

In state-of-the-art display systems incorporating micromirrors, contrast is achieved through digital modulation. The light modulator is a micromechanical structure that incorporates thousands to millions of movable, micromechanical mirrors. Each micromirror rests in one of two possible positions which result in a tiny area of the displayed image appearing white or black. In a given static micromirror state the displayed image is composed of tiny light and dark areas known as pixels. Each pixel is a spot of light at either the maximum or minimum intensity that the display is capable of generating.

Display of intermediate intensity or gray light levels is achieved in conventional devices by alternating a micromirror's position between its white or black position so fast that the flicker between the bright and dark state is not noticeable by a human observer. For example, a micromirror that is made to alternate between its white or black position several hundred or thousands of times per second will project a spot that appears gray to an observer.

Since mirrors in conventional devices have two possible positions ("white" and "black"; "bright" and "dark"; "on" and "off"; "1" or "0"; etc.), gray levels are displayed by sending binary data to each micromirror. For example, a binary sequence in which the display is "on" half the time, e.g. white-black-white-black-white-black-white-black (or, equivalently, "10101010"), results in the display of a spot (equivalently, "image element", "pixel", etc.) whose intensity appears to a human observer to be continuously that of a spot of approximate intensity "½" or approximately midway between white and black.

Similarly, the sequence "00000101" or any other sequence with six zeros and two ones would correspond to continuous intensity "¼" or one quarter of the maximum display brightness. In general the fractional brightness observed corresponds to the fraction of time that a given pixel is in its "on" state.

Pulse width modulation schemes are also possible with a two-position light modulator. If we define a "frame time" as the time between sequential images projected by a display, then in pulse width modulation, a pixel is set in its "on" state for a fraction of the frame time corresponding to its intensity expressed as a fraction of the maximum possible intensity.

Since contrast is achieved in digital micromirror systems by binary modulation of the micromirror position the number of possible light levels that can be shown by a digital micromirror display is set by the number of different fractional "on" times or "time slots" that can be accommodated within a frame time. Theoretically, if a large enough number of time slots could be achieved with the micromirror system any desired contrast could be achieved. However, this would require mirrors that switch arbitrarily fast.

In practice, the maximum number of time slots is set by several factors. The image must be updated at least 20–60 times per second (i.e. the frame time is approximately $\frac{1}{60}$–$\frac{1}{20}$ seconds) to prevent the human observer from noticing an artificial flicker and to prevent undesirable artifacts when an object in an image appears to move quickly across the viewing area. The mirrors also take a finite time to switch from one state to the other and stabilize in their new state. For example, in conventional display systems each micromirror takes approximately 20 microseconds to switch position. Finally, each image corresponding to a particular placement of objects in view must be repeated for red, green, and blue color channels to be presented. All of these constraints limit the number of gray levels than can be displayed.

The electromechanical control scheme for micromirrors also affects contrast. The micromirror control circuitry "must drive the micromirror from one extreme landing position to the other at very high speed as incoming video data dictates," according to "DMD pixel mechanics simulation," by Robert E. Meier, TI Technical Journal, p. 64–74, July–September 1998; see especially p. 66, p. 72, and FIG. 7. Also, improper timing of control pulses "can lead to undesirable contrast ratio degradation" if the micromirror either switches unintentionally or follows an undesired trajectory, ibid.

The maximum contrast achieved in a conventional micromirror display system is approximately a 1000:1 ratio between the brightest and darkest pixel presented. Human vision, however, is sensitive to brightness levels that vary by a ratio of as much as 10000:1. Therefore, methods and apparatus are desired for constructing and modulating a micromirror device such that high contrast is achieved.

SUMMARY OF THE INVENTION

In view of the forgoing, the present invention provides a method and an apparatus for achieving high contrast in a micromirror-based display device. Specifically a method and apparatus for displaying an increased number of low intensity gray levels is disclosed. As a result the displayed image is a more faithful reproduction of the original and is more pleasing to human perception than is possible with a low contrast display.

In one embodiment of the invention a method for displaying an image is disclosed wherein light is directed onto a micromirror array, the micromirrors in the array are modulated and analog modulation in combination with digital modulation is used to achieve grayscale levels in the displayed image.

In another embodiment of the invention an apparatus for displaying an image is disclosed comprising micromirrors in a micromirror array and an electronic controller which sends analog or digital control signals, depending on the light level desired, to the micromirrors in the micromirror array.

It will be appreciated that the current invention provides one or more of the following features.

First, high contrast is achieved since the minimum amount of light that can be projected during a frame time is less than that projected during one time slot in a digital projection scheme.

Second, efficient use is made of light intensity data that arrive at the micromirror controller at a limited data rate. The combined analog and digital algorithms in the controller provide more different light levels at low intensities than are possible using only a digital algorithm.

These and other features that will be apparent to those skilled in the art are described in the detailed description of the invention below.

BRIEF DESCRIPTION OF DRAWINGS

For a more complete understanding of the present invention, reference is now made to the following Detailed Description taken in conjunction with the accompanying Drawings in which.

DETAILED DESCRIPTION OF THE INVENTION

Processes for micro-fabricating a microelectromechanical system (MEMS) device such as a micromirror and micromirror array are disclosed in U.S. Pat. Nos. 5,835,256 and 6,046,840 both to Huibers, the subject matter of each being incorporated herein by reference.

The present invention provides a method and an apparatus for achieving high contrast with a micromirror-based video display. The distinguishing feature of the invention is that the range of gray levels normally available from a digital micromirror display is extended by employing analog techniques and analog devices. The ability to display more different light levels leads to improved contrast and a more faithful, pleasing display.

The invention provides a method for combining analog and digital control of micromirror displays and a micromirror design that is compatible with the hybrid analog-digital control scheme. Gray levels for relatively bright pixels are produced using conventional digital modulation techniques while those for relatively dim pixels are produced by driving the micromirror to intermediate states between "on" and "off" using analog drive techniques.

Conventional micromirror display devices are inherently digital machines. At any given time each element or pixel in the display is either "on" at its maximum intensity or "off" at its minimum intensity. The design of many micromirror devices is such that the micromirror will remain indefinitely in either the "on" or "off" state unless an instruction to switch state is applied.

Fortunately micromirrors can be switched from the "on" state to the "off" state much faster than a human observer can perceive the transition. Therefore the perception of intermediate display intensities can be achieved by switching a micromirror on and off quickly during one video frame time.

In a conventional, digital device the number of different perceived display intensities depends on how fast the mirrors can switch from "on" to "off". The quicker the switching time, the more time slots exist per frame time and the more gray levels can be displayed.

Human vision is very sensitive to variations in intensity, especially at low light levels. Digital micromirror switching times have been optimized for years and yet can still be too slow to render enough gray levels to reproduce subtle light level changes that are obvious to human observers. A solution to this problem is provided by the present invention.

A micromirror-based spatial light modulator comprises an array of micromirrors for spatially modulating light. The spatial light modulator and the micromirror array within the spatial light modulator have a variety of applications, such as digital display systems, maskless lithography, atomic spectroscopy, maskless fabrication of DNA microarrays, signal processing, and microscopy.

Figure 1:
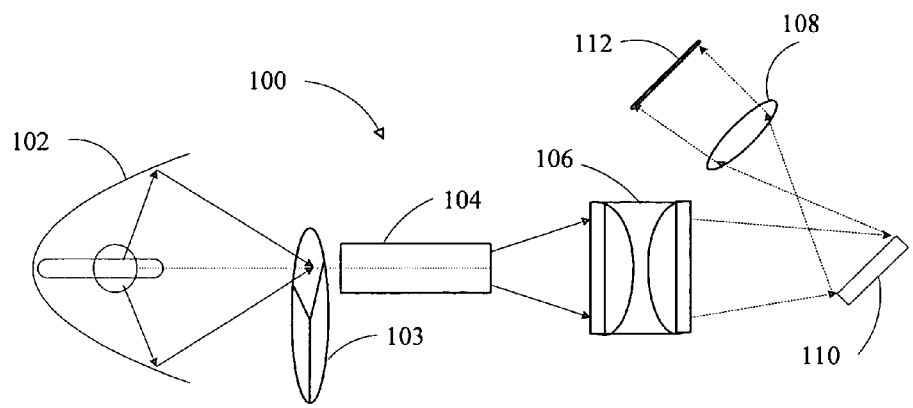
FIG. 1 is a diagram that schematically illustrates an exemplary display system employing a spatial light modulator having an array of micromirrors.

Turning to the drawings, FIG. 1 is a diagram schematically illustrating an exemplary display system in which the various embodiments of the invention can be implemented. Referring to FIG. 1, in one basic configuration, the display system 100 comprises light source 102, optical devices (e.g. color wheel 103, light pipe 104, collection optics 106 and projection optics 108), and spatial light modulator 110 that further comprises an array of micromirrors. Also shown is a display target 112 onto which an image is directed. Light source 102 (e.g. an arc lamp) directs light through the light integrator/pipe 104 and collection optics 106 and onto spatial light modulator 110. The micromirrors of the spatial light modulator 110 are selectively actuated by a controller so as to reflect incident light into projection optics 108, resulting in an image on display target 112 (screen, a viewer's eyes, a photosensitive material, etc.). Generally, more complex optical systems are often used, especially in display applications for color images, such as the display system in FIG. 2.

Figure 2:
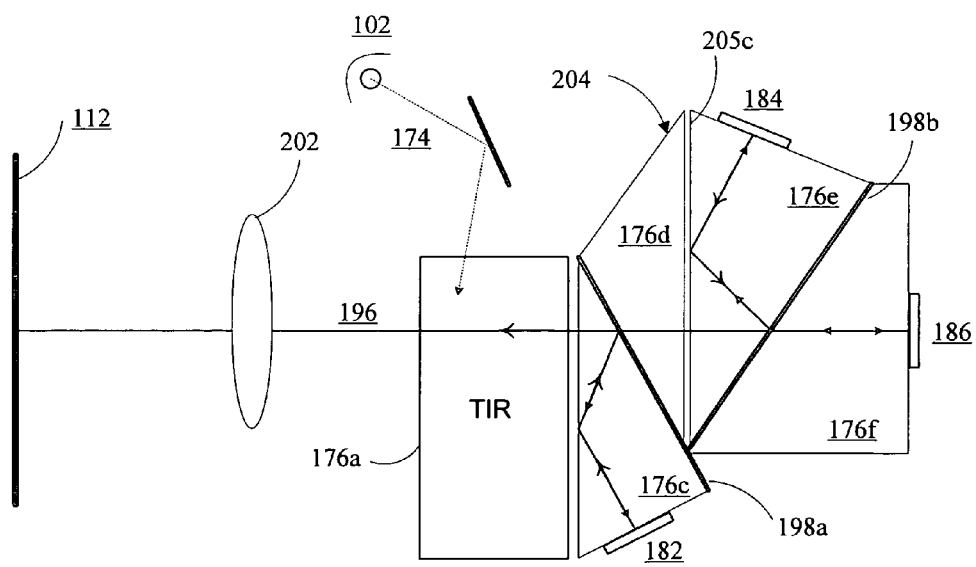
FIG. 2 is a diagram that schematically illustrates another exemplary display system employing three spatial light modulators, each having an array of micromirrors.

Referring to FIG. 2, another exemplary display system employing three spatial light modulators, each comprising an array of micromirrors for respectively modulating multi-color (e.g. three colors such as red, green and blue) light beams, is presented therein. The display system employs a dichroic prism assembly 204 for splitting incident light into three primary color light beams. Dichroic prism assembly comprises prisms 176a, 176c, 176d, 176e and 176f. Total-internal-reflection (TIR) surfaces, i.e. TIR surface 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into prism 176a and is directed toward a TIR surface at an angle larger than the critical TIR angle of the TIR surface. The TIR surface totally internally reflects the incident white light toward spatial light modulator 186, which is used for modulating the blue light component of the incident white light. At the dichroic surface 198a, the green light component of the totally internally reflected light separated therefrom and reflected toward spatial light modulator 182, which is used for modulating green light. As seen, the separated green light may experience TIR in order to illuminate spatial light modulator 182 at a desired angle. This can be accomplished by arranging the incident angle of the separated green light onto the TIR surface at larger than the critical TIR angle of the TIR surface. The rest of the light components, other than the green light, of the reflected light from the TIR surface pass through dichroic surface 198a and are reflected at dichroic surface 198b. Because dichroic surface 198b is used for reflecting the red light component, the red light component of the incident light onto dichroic surface 198b is thus separated and reflected onto spatial light modulator 184, which is used for modulating red light. Finally, the blue component of the white incident light (white light 174) reaches spatial light modulator 186 and is modulated thereby. By combining operations of the three spatial light modulators, red, green and blue light can be properly modulated. The modulated red, green and blue light is recombined and delivered onto display target 112 through optic elements, such as projection lens 202, if necessary.

Figure 3:
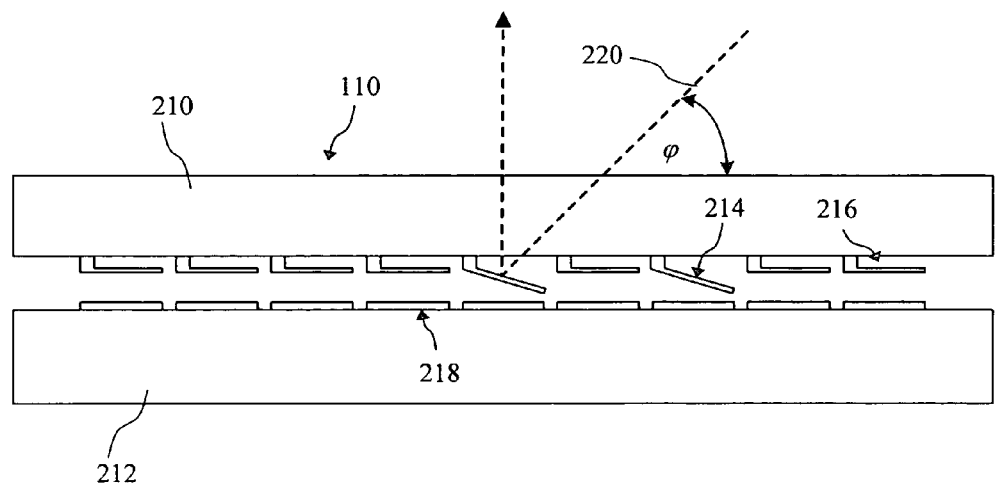
FIG. 3 is a cross-sectional view of the spatial light modulators depicted in FIG. 1 and FIG. 2.

The spatial light modulator, in general, comprises an array of thousands or millions of micromirrors. FIG. 3 illustrates a cross-sectional view of a portion of an exemplary spatial light modulator of FIG. 1 and FIG. 2. For simplicity and demonstration purposes, micromirrors and electrodes are shown in diagrammatical sketches and only nine micromirrors and electrodes are illustrated therein for convenience. Referring to FIG. 3, micromirror array device 110 comprises an array of micromirrors (e.g. micromirror 214) formed on substrate 210, which can be a glass or quartz substrate transparent to visible light in this example. A typical size of the micro-micromirror is a few micrometers or less. The glass or quartz substrate may have optical films, such as an anti-reflection film coated thereon. The micromirrors spatially modulate the incident light by selectively reflecting the incident light toward or away from a projection lens (e.g. projection lens 108 in FIG. 1) for producing images or videos on a display target (e.g. display target 112 in FIG. 1). Although the mirrors may be deflected from a fully OFF state to a fully ON state, they may also be partially deflected to intermediate states whose corresponding pixel intensities are intermediate between the brightest and darkest pixel intensities in the image. The selective reflection of the incident light by the micromirrors is accomplished through an array of electrodes (e.g. electrode 218) and circuitry (not shown). Specifically, each micromirror comprises a micromirror plate, which is associated with an electrode. An electrostatic field can thus be established between the micromirror plate and the associated electrode. In response to the established electrostatic field, the micromirror plate rotates to either an ON state or an OFF state or partially rotates to a position intermediate between ON and OFF. In the ON state, the micromirror plate reflects the incident light into the projection lens (e.g. 108), and in the OFF state, the micromirror plate reflects the incident light away from the projections lens. In intermediate states or positions the intensity of the corresponding pixel in the image is intermediate between the brightest and darkest possible pixel intensities. The correspondence between partial deflection and intermediate intensity is a direct result of the optical properties of a standard imaging system as is readily apparent to those skilled in the art. In this particular example, the array of electrodes and circuitry is formed on substrate 212, which is preferably a die from a semiconductor wafer. Alternatively, micromirrors can be formed on the same substrate as that on which are formed the electrodes and circuitry—though this embodiment is not shown herein. The hinge arrangement and rotation of the mirrors illustrated in FIG. 3 is simplified.

In the present invention each micromirror has one stable rest deflection, e.g. the deflection of micromirror 216. A deflected micromirror, e.g. micromirror 214, may be temporarily deflected to any position between and including its rest position and its position of maximum deflection. However in the present invention a micromirror will not remain in any deflection position other than its rest position unless an electrostatic force is applied.

In order to produce the perception of a gray-scale or full color image in such a display system, the conventional procedure is to rapidly modulate the pixels between "ON" and "OFF" states such that the average over a time period (e.g. the time period corresponds to the critical flicker frequency) of their modulated brightness corresponds to the desired "analog" brightness for each pixel. This technique is generally referred to as pulse-width-modulation (PWM). Above a certain modulation frequency, the viewer's eyes and brain integrate a pixel's rapidly varying brightness and perceived brightness is determined by the pixel's average illumination over a period of time. The modulation of illumination of pixels is controlled by electrodes and circuitry associated with the pixels of the display system as discussed above in reference to FIG. 3.

Human perception of brightness is nonlinear. For example, a light source that emits only 18% of the intensity of a reference appears half as bright to a human observer. Therefore, a linear recording of the brightness of each pixel in a digital image wastes digital storage capacity and digital data transmission rate.

For example, consider an 8-bit encoding scheme which represents 256 intensity levels equally spaced in intensity. A human observer discerns intensity or brightness more precisely at low intensity than at high intensity. Hence if the levels are spaced closely enough to make gradients of shading at low light levels seem smooth, they will be unnecessarily closely spaced at high light levels. Alternatively if the levels are spaced apart such that gradients of shading at high light level appear smooth, but only barely so, the spacing will be far too coarse at low light levels and shading will appear jagged. In other words, linear encoding of light levels for pixels in an image intended for human observation is wasteful of digital data and creates problems if high data rates are necessary for rapidly moving or otherwise complex images.

In order to save bits, digital image data is power law encoded. In one embodiment the function used is: a power law for higher intensities, and a linear function at the low end. The power law exponent is referred to as the gamma value. For example the following function may be used:

$$L(n) = \frac{n}{4.5} \text{ for } n \leq 0.081 \text{ and } L(n) = \left(\frac{n + 0.099}{1.099}\right)^{\frac{1}{0.45}} \text{ for } n \geq 0.081.$$

In the composite function above, n is a coded, digital value, and L(n) is the intended amount of light to be shown for this value. The function may be implemented in a lookup table in the memory of the electronic controller that drives the micromirror display. For example, 8-bit encoded data may be converted with the above composite function into a larger number of bits, for example 10 or 12, where the new binary data linearly corresponds to the amount of light to be displayed in a particular pixel of the image.

In an alternate embodiment power law encoding is used for the entire range above the first few levels.

Digital pulsewidth modulation of micromirrors to achieve gray scale is limited by the time taken up turning the display on or off during the limited number of time slots in each frame time. The intensity is linearly proportional to the number of time slots during which a micromirror is "on" divided by the total number of time slots available in a frame time.

In the present invention the number of gray levels is extended by analog control of brightness within each time slot.

Figure 4:
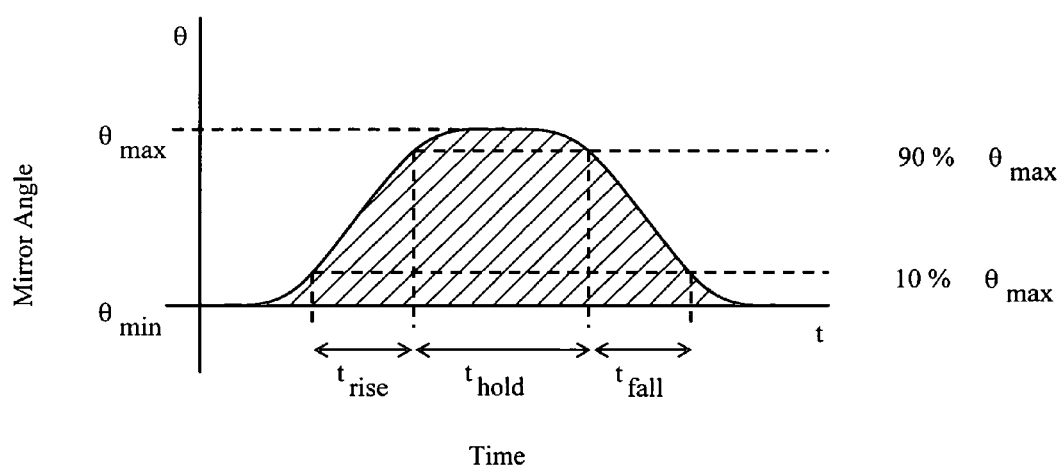
FIG. 4 is a graph of a typical micromirror angle versus time function for a micromirror under conventional pulse width modulation control.

Referring to FIG. 4, the angular displacement function of a micromirror under conventional digital modulation in a micromirror array according to an embodiment of the invention is illustrated therein. According to the figure the position of the micromirror depends on time. When an electrical signal is sent to the micromirror, it moves from its resting position to its "on" position.

The rise time, $t_{rise}$, describes the time required for the micromirror to move from the resting position to the "on" position, while the fall time, $t_{fall}$, describes the time required for the micromirror to move from the "on" position back to the resting or "off" position. More specifically the rise time, $t_{rise}$, is often stated as the time for the micromirror to move from angular deflection, θ, equal to 10% of its maximum value to angular deflection, θ, equal to 90% of its maximum value. The fall time is similarly defined as shown in the figure.

The hold time, $t_{hold}$, is the amount of time that the micromirror is left in the "on" state. This describes the basic parameters for the micromirror position versus time for the conventional digital mode of operation for micromirror devices. Of course, the rise and fall may not always be smooth as depicted in FIG. 4, but the concept of rise and fall times applies nonetheless.

Figure 5:
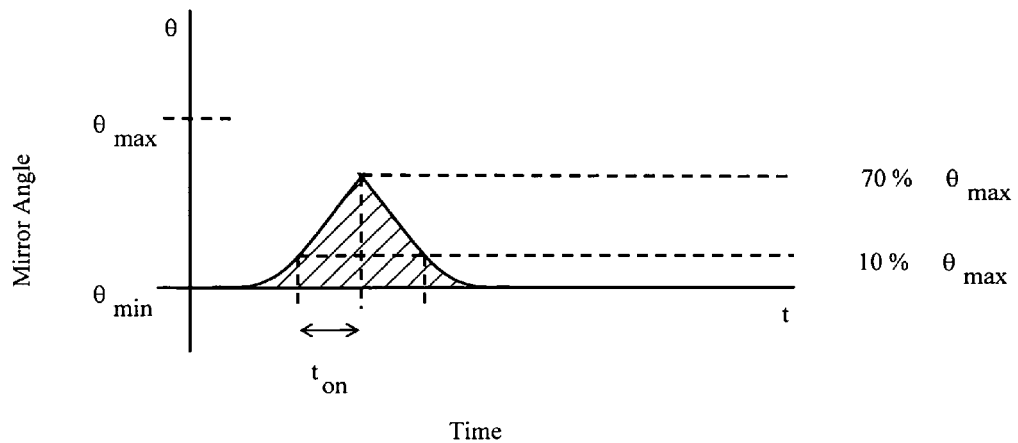
FIG. 5 is a graph of a typical micromirror angle versus time function for a micromirror where the actuating control pulse is shorter than the minimum time required for the micromirror to achieve full deflection.

Referring to FIG. 5, the angular displacement function of a micromirror in a micromirror array under analog modulation according to an embodiment of the invention is illustrated therein. In this case, the micromirror control voltage is turned off before the micromirror travels to its full deflection. The micromirror only travels part way. Its angular deflection does not continue to $θ_{max}$ but stops at 70% $θ_{max}$. In the figure, the fact that the micromirror was deflected to 70% $θ_{max}$ is used as an example. It could have been deflected to any desired angle between $θ_{min}$ and $θ_{max}$.

In both FIG. 4 and FIG. 5, the perceived integrated intensity that appears in an image is directly proportional to the area under the curve represented by the shaded area. The correspondence between intensity and shaded area under the curves as shown in FIG. 1 and FIG. 2 is a property of standard imaging optics in the projection system and will be readily apparent to those of ordinary skill in the art of image projection optics.

Figure 6:
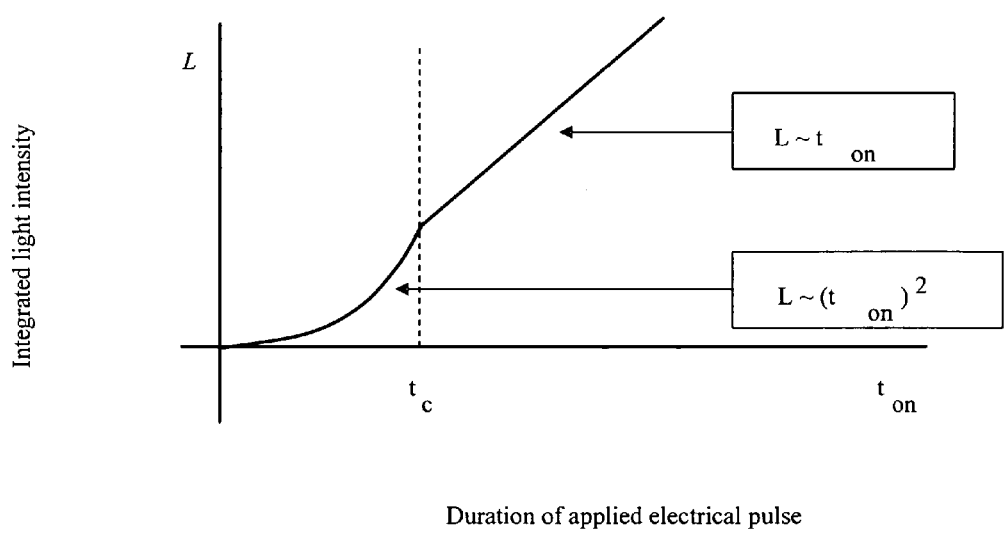
FIG. 6 is a graph of integrated light intensity versus electrical pulse duration for a micromirror.

Referring to FIG. 6, perceived integrated light intensity versus electrical pulse width applied to a micromirror is illustrated therein. The perceived brightness corresponds to the integrated light intensity due to the slow response time of the retina. Assuming linear rise and fall characteristics for illustrative purposes, the integrated light intensity is proportional to the square of the duration of the electrical pulse for pulses that are shorter than the rise time. Conversely for pulses that are longer than the rise time, the integrated light intensity is linearly proportional to the duration of the electrical micromirror control pulse.

The integrated light intensity, L, corresponds to the brightness of a pixel in a display as perceived by a human observer. L depends on the duration, $t_{on}$, of the electrical pulse applied to the micromirror. If the duration is shorter than that required to move the micromirror to its maximum deflection, then L is approximately proportional to the square of the duration. In alternate embodiments, if the duration is shorter than that required to move the micromirror to its maximum deflection, then L is approximately proportional to a nonlinear function of the duration.

On the other hand, if the duration is longer than that required to move the micromirror to its maximum deflection, then L is approximately linearly proportional to the duration. In the figure, time $t_c$ denotes the time required for the micromirror to move to its maximum deflection angle or position.

Conventionally the minimum duration for a time slot within a video frame time is set by the micromirror rise and fall times. The minimum time slot in a digital system is equal to the sum of the rise and fall time and possibly some minimum dwell time. For conventional, bi-stable mirrors the minimum time slot is a limitation of the system.

However, the present invention provides mirrors that can be propelled part way between the "off" and "on" positions by short duration electrical pulses as explained above and shown in FIG. 5.

Figure 7:
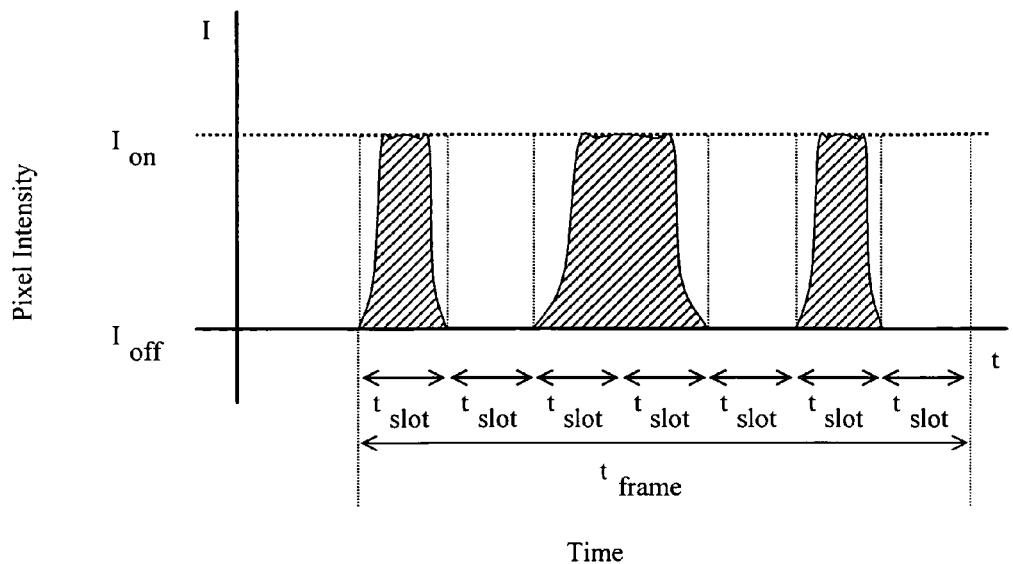
FIG. 7 shows a graph of light intensity at a pixel in an image during an image frame in an all-digital micromirror modulation scheme.

Referring to FIG. 7, light intensity at a pixel in an image displayed by a conventional micromirror-based display under digital pulsewidth modulation is illustrated therein. In a conventional all-digital system, two possible pixel light intensities are possible, $I_{on}$ and $I_{off}$. The frame time, $t_{frame}$, is the amount of time available for display of one set of pixel intensities representing an image. It must be shorter than the inverse of the critical flicker frequency to prevent the perception of flicker by a human observer. In the figure the frame time is divided into seven time slots of equal duration, $t_{slot}$. It is not necessary that the number of time slots be equal to seven. Generally the number of time slots per frame is much larger than illustrated here, typically between approximately 10 and approximately 1000. Only seven time slots are shown here in the frame time for ease of illustration and discussion.

The maximum number of time slots is determined by the physical switching speed of the micromirrors. Since there are seven time slots in the frame illustrated in the figure, the maximum number of different integrated light intensities that can be presented to a viewer using this system is eight. In particular the possible light intensities correspond to pixel being turned on during zero, one, two, three, four, five, six, or seven time slots during the frame time. It is not possible to create a pixel intensity intermediate between that corresponding to illumination during consecutive integer numbers of time slots.

Figure 8:
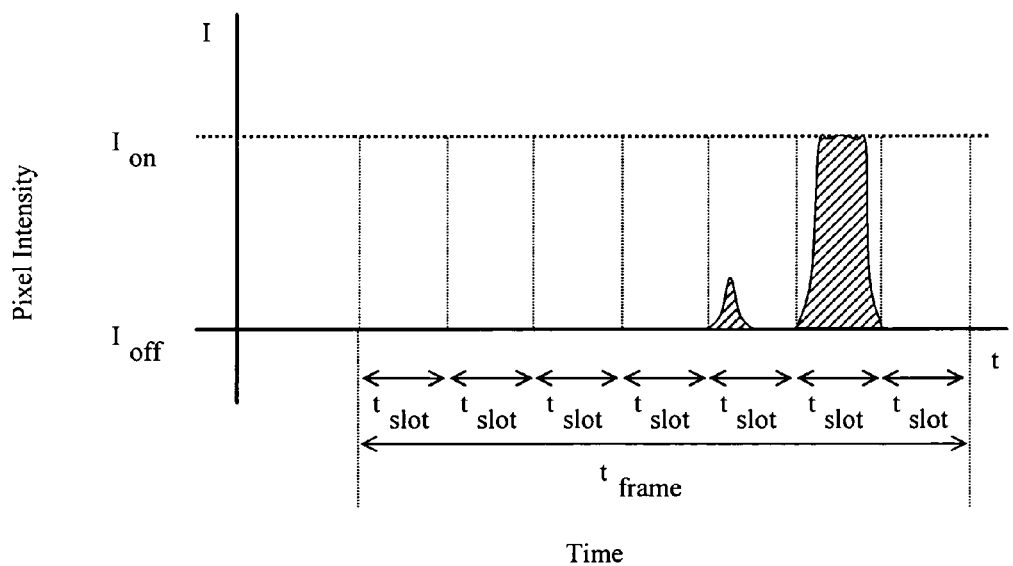
FIG. 8 shows a graph of light intensity at a pixel in an image during an image frame in a combined digital and analog micromirror modulation scheme.

Referring to FIG. 8, light intensity at a pixel in an image displayed by a micromirror-based display of the present invention under combined digital pulsewidth modulation and analog modulation is illustrated therein. In this illustration the pixel is turned off during the first, second, third, fourth, and seventh time slot. The pixel is turned on under digital control during the sixth time slot and it is deflected under analog control to an angle between the off and on states during the fifth time slot. Because the pixel was only partially deflected during the fifth time slot, the integrated intensity during that time slot is intermediate between zero and the normal integrated intensity illustrated during the sixth slot.

Hence it is apparent that a combined analog and digital control system, i.e. a system that applies control voltages corresponding to either full digital modulation of the mirrors or partial analog modulation of the mirrors, has the advantage that more different intensity levels per pixel may be displayed in any particular frame time. Where the digital system is limited to a number of displayable intensity levels equal to the number of time slots per frame time, the combined analog/digital system can display more intensity levels than the number of time slots in the frame time.

Figure 9:
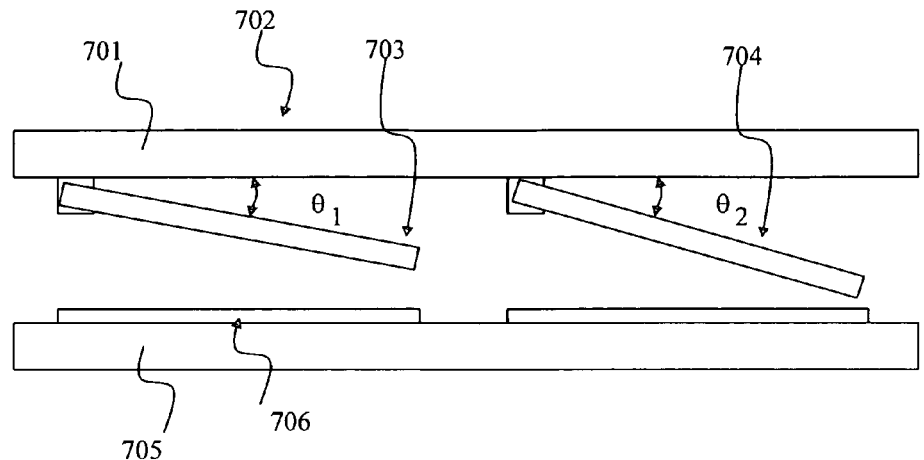
FIG. 9 is a cross-sectional view of two representative mirrors of a spatial light modulator that are deflected at two different angles.

Spatial light modulators usually comprise an array of thousands or millions of micromirrors. FIG. 9 illustrates a cross-sectional view of micromirrors of an exemplary spatial light modulator of FIG. 1, FIG. 2, or FIG. 3. For simplicity and demonstration purposes, micromirrors and electrodes are shown in diagrammatical sketches and only two micromirrors and electrodes are illustrated therein for convenience. Referring to FIG. 9, micromirror array device 702 comprises an array of micromirrors (e.g. micromirror 703) formed on substrate 701, which may be a glass or quartz substrate transparent to visible light. A typical size of the micromirror is a few micrometers. The glass or quartz substrate may have optical films, such as an anti-reflection film coated thereon.

The micromirrors spatially modulate the incident light by selectively reflecting the incident light toward or away from a projection lens (e.g. projection lens 108 in FIG. 1) for producing images or videos on a display target (e.g. display target 112 in FIG. 1). Although the mirrors may be deflected from an OFF state to an ON state, they may also be partially deflected to intermediate states whose corresponding pixel intensities are intermediate between the brightest and darkest pixel intensities in the image.

For example, in FIG. 9 micromirror 703 is deflected to an angle $\theta_1$ which results in a corresponding pixel intensity between OFF and ON. Similarly, in FIG. 9 micromirror 704 is deflected to an angle $\theta_2$ which results in a corresponding pixel intensity different from that of micromirror 703, but still between OFF and ON.

The selective reflection of the incident light by the micromirrors is accomplished through an array of electrodes (e.g. electrode 706) and circuitry (not shown). Specifically, each micromirror comprises a micromirror plate, which is associated with an electrode. An electrostatic field can thus be established between the micromirror plate and the associated electrode. In response to the established electrostatic field, the micromirror plate rotates to either an ON state or an OFF state or partially rotates to a position intermediate between ON and OFF. In the ON state, the micromirror plate reflects the incident light into the projection lens (e.g. 108 in FIG. 1), and in the OFF state, the micromirror plate reflects the incident light away from the projections lens. In intermediate states or positions the intensity of the corresponding pixel in the image is intermediate between the brightest and darkest possible pixel intensities. The correspondence between partial deflection and intermediate intensity is a direct result of the optical properties of a standard imaging system as is readily apparent to those skilled in the art. In this particular example, the array of electrodes and circuitry is formed on substrate 705, which is preferably a die from a semiconductor wafer. Alternatively, micromirrors can be formed on the same substrate as that on which are formed the electrodes and circuitry, although this embodiment is not shown herein.

The hinge arrangement and rotation of the micromirrors illustrated in FIG. 9 is simplified. In particular it is not necessary that the micromirrors be hinged at the end. A hinge could be placed in the middle, for example. A micromirror hinged in the middle tilts in one or more directions away from its resting position when a force is applied.

In the present invention the micromirror has only one stable rest deflection, not shown in FIG. 9. A deflected micromirror, e.g. micromirror 703 or 704, may be temporarily deflected to any position between and including its rest position and its position of maximum deflection. However in the present invention a micromirror will not remain in any deflection position other than its rest position unless an electrostatic force is applied.

Clearly in both FIG. 7 and FIG. 8 it makes no difference to the viewer what order the digital pulses or partial analog deflections occur nor does it matter in which time slot they occur. The order could be a matter of engineering convenience in an analog/digital controller circuit driving the display.

Figure 10:
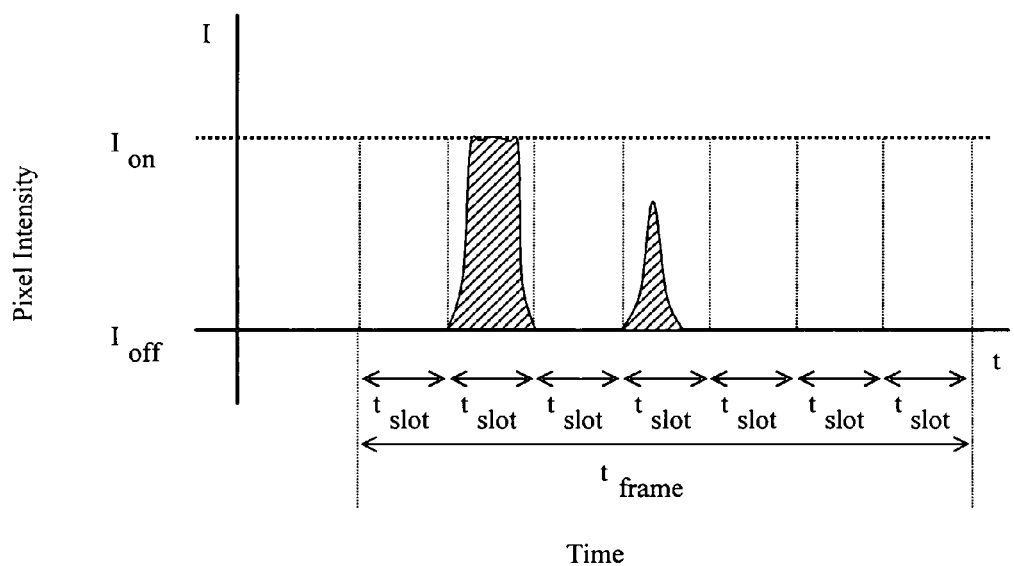
FIG. 10 shows a graph of light intensity at a pixel in an image during an image frame in a combined digital and analog micromirror modulation scheme.

For example in FIG. 10 light intensity at a pixel in an image displayed by a micromirror-based display of the present invention is illustrated therein similar to that shown in FIG. 8. In FIG. 10 the pixel is deflected to an intermediate position during a different time slot and to a different intermediate deflection angle than was illustrated in FIG. 8. Also in FIG. 10 the pixel is deflected to its ON position during a different time slot than was illustrated in FIG. 8. The intermediate micromirror position or deflection angle during one time slot results in more light at the pixel during the frame illustrated in FIG. 10 compared to FIG. 8, but in both cases the amount of light is intermediate between that achieved by frames containing a single ON time slot and two ON time slots.

Of course it is not necessary that any time slots in a frame are occupied by an ON pixel. Light levels corresponding to less than one ON time slot per frame are achieved by a partial micromirror deflection during one time slot in the frame and OFF time slots at all other times during the frame.

Hence it is apparent that a combined analog and digital control system, i.e. a system that applies control voltages corresponding to either full ON (or "digital") modulation of the mirrors or partial deflection (or "analog") modulation of the mirrors, has the advantage that more different intensity levels per pixel may be displayed in any particular frame time. Where the digital system is limited to a number of displayable intensity levels equal to the number of time slots per frame time, the combined analog/digital system can display more intensity levels than the number of time slots in the frame time.

It will be appreciated by those of skill in the art that a new and useful apparatus and method have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention.

In particular, although control pulses that are shorter than the minimum duration digital control pulses are described herein as "analog" control pulses because they cause mirrors to achieve controlled, partial deflection, it will be immediately obvious to those skilled in the art that the "analog" control pulses can be represented digitally and reproduced with digital to analog converters. In other words, "analog" simply refers to control pulses that result in partial micromirror deflections and "digital" refers to control pulses that result in full micromirror deflections.

"Analog" as used in the present invention also may include operation of a micromirror where the micromirror is deflected to an angle $\theta_1$ less than its maximum possible deflection angle $\theta_{max}$ ($\theta_1 < \theta_{max}$) and remains deflected to angle $\theta_1$ with approximately zero angular velocity for longer than an instantaneous time; i.e. the time for which the angular velocity is zero during a velocity reversal encountered at the extreme points in the motion of a vibrating micromirror in the absence of electrostatic driving forces. In various embodiments, the micromirror is deflected to, or stopped at, angle $\theta_1$ through: the application of analog control voltages; mechanical stops; or, by remaining at a natural rest position intermediate between positions achieved by electrostatic actuation. In further embodiments, additional angles $\theta_2$, $\theta_3$, $\theta_4$, etc. analogous to $\theta_1$ may exist.

Therefore, the invention as described herein contemplates all such embodiments as may come within the scope of the following claims and equivalents thereof.

I claim:

1. A method for displaying an image, comprising:
   directing light onto a micromirror array;
   modulating micromirrors within the micromirror array; and
   using analog modulation in combination with digital modulation to achieve grayscale levels in the displayed image.

2. The method as in claim 1 wherein the number of grayscale levels in the displayed image is greater than the number of time slots per image frame time.

3. An apparatus for displaying an image, comprising:
   micromirrors in a micromirror array; and
   an electronic controller which sends analog or digital control signals, depending on the light level desired, to the micromirrors in the micromirror array.

4. The apparatus as in claim 3 wherein, the electronic controller uses an algorithm or a lookup table to convert linear encoded light level data to nonlinear analog or digital micromirror control signals.

5. The apparatus as in claim 3 wherein, the analog control signals are amplitude modulated signals and the digital control signals are digital pulsewidth modulated signals.

6. The apparatus as in any of claims 3, wherein each micromirror in the micromirror array has only one landing pad or mechanical stop.

7. The apparatus as in claim 6, wherein the micromirrors in the micromirror array are deflected by the application of electrostatic force.

8. The apparatus as in claim 7 wherein, the micromirrors in the micromirror array are deflected to positions intermediate between the resting position and the maximum deflection position.

9. The apparatus as in claim 8 wherein, the micromirrors in the micromirror array always return to the same position when electrostatic forces are removed.

10. The apparatus as in claim 8 wherein, only one electrical pulse is used per image frame.

11. The apparatus as in claim 8 wherein, more than one electrical pulse is used to direct the micromirror to a position intermediate between the resting position and the maximum deflection position.

12. The apparatus as in claim 8 wherein, the amount of light appearing at a pixel in the image during an image frame depends on the duration of the application of electrical force to the micromirror corresponding to the pixel such that
   when the duration of the force is less than that required to move the micromirror to its position of maximum deflection, the amount of light appearing at the pixel in the image during the image frame is approximately proportional to the square of the duration of the force; and
   when the duration of the force is more than that required to move the micromirror to its position of maximum deflection, the amount of light appearing at the pixel in the image during the image frame is approximately linearly proportional to the duration of the force.

13. The apparatus as in claim 9 wherein, when an electrical control pulse is applied to a micromirror in the micromirror array, the release of stored mechanical energy is not significant compared to the electrostatic force applied.

14. The apparatus as in claim 13 wherein, no stored mechanical energy is released when the micromirror is deflected by electrostatic force.

15. A method for displaying an image, comprising:
   directing light onto an array of tilting micromirrors;
   tilting micromirrors within the micromirror array; and
   using analog and digital techniques wherein the
      analog techniques include tilting the micromirrors to arbitrary angles between their minimum and maximum deflection angles, and the
      digital techniques include tilting the micromirrors to only their minimum or maximum deflection angles for varying time periods.

16. A method for displaying an image, comprising:
   directing light onto an array of tilting, flat-plate micromirrors;
   deflecting micromirrors within the micromirror array to various tilt angles;
   combining analog and digital techniques to control the tilt angles according to digitally encoded pixel intensity data.

17. The method as in claim 16 wherein,
   maximum and minimum tilt angles are controlled using digital techniques for all but the least significant bit of the intensity data, and
   intermediate tilt angles are controlled by analog techniques for the least significant bit of the intensity data.

18. An apparatus for displaying an image, comprising:
   micromirrors in a micromirror array; and
   an electronic controller which sends analog modulated control signals in combination with digital modulated control signals appropriate to partially deflect or fully deflect, depending on the light level desired, the micromirrors in the micromirror array.

19. The apparatus as in claim 18 wherein, the electronic controller uses an algorithm or a lookup table to convert linear encoded light level data to micromirror control data that results in partial or full micromirror deflection signals.

20. The apparatus as in claim 18 wherein, the analog control signals are amplitude modulated signals and the digital control signals are digital pulsewidth modulated signals.

21. The apparatus as in any of claim 18 wherein, each micromirror in the micromirror array has only one landing pad or mechanical stop.

22. The apparatus as in claim 21 wherein, the micromirrors in the micromirror array are deflected by the application of electrostatic force.

23. The apparatus as in claim 22 wherein, the micromirrors in the micromirror array are deflected to positions intermediate between the resting position and the maximum deflection position.

24. The apparatus as in claim 23 wherein, the micromirrors in the micromirror array always return to the same position when electrostatic forces are removed.

25. The apparatus as in claim 23 wherein, only one electrical pulse is used per image frame.

26. The apparatus as in claim 23 wherein, more than one electrical pulse is used to direct the micromirror to a position intermediate between the resting position and the maximum deflection position.

27. The apparatus as in claim 23 wherein, the amount of light appearing at a pixel in the image during an image frame depends on the duration of the application of electrical force to the micromirror corresponding to the pixel such that
when the duration of the force is less than that required to move the micromirror to its position of maximum deflection, the amount of light appearing at the pixel in the image during the image frame is not linearly proportional to the duration of the force; and
when the duration of the force is more than that required to move the micromirror to its position of maximum deflection, the amount of light appearing at the pixel in the image during the image frame is approximately linearly proportional to the duration of the force.

28. The apparatus as in claim 24 wherein, when an electrical control pulse is applied to a micromirror in the micromirror array, the release of stored mechanical energy is not significant compared to the electrostatic force applied.

29. The apparatus as in claim 28 wherein, no stored mechanical energy is released when the micromirror is deflected by electrostatic force.

30. A method for displaying an image, comprising:

directing light onto a micromirror array;

modulating micromirrors within the micromirror array; and, using analog modulation in combination with digital modulation to achieve grayscale levels in the displayed image, wherein analog modulation includes operation of a micromirror where the micromirror is deflected to an angle $\theta_1$ less than its maximum possible deflection angle $\theta_{max}$ and remains deflected to angle $\theta_1$ with approximately zero angular velocity for longer than an instantaneous time, i.e. the time for which the angular velocity is zero during a velocity reversal encountered at the extreme points in the motion of a vibrating micromirror in the absence of electrostatic driving forces.

31. The method as in claim 30 wherein the digital modulation is pulsewidth modulation.

32. The method as in claim 30 wherein the micromirror is deflected to, or stopped at, angle $\theta_1$ through the application of analog control voltages to one or more control electrodes.

33. The method as in claim 30 wherein the micromirror is deflected to, or stopped at, angle $\theta_1$ by mechanical stops.

34. The method as in claim 30 wherein the micromirror is deflected to, or stopped at, angle $\theta_1$ by remaining at a natural rest position intermediate between positions achieved by electrostatic actuation.

35. The method as in claim 30 wherein the micromirror is deflected to one of a plurality of possible deflection angles $\theta_i$ less than its maximum possible deflection angle $\theta_{max}$.

36. A method for displaying an image, comprising:

directing light onto a micromirror array;

deflecting micromirrors within the micromirror array; and using a plurality of micromirror deflection angles to achieve grayscale levels in the displayed image wherein the brightness of one or more pixels in the image is controlled by analog modulation of a micromirror or micromirrors and the brightness of one or more other pixels in the image is controlled by digital pulsewidth modulation of a micromirror or micromirrors.

* * * * *